Sept. 3, 1968  J. A. CEROW  3,399,862
YOKE ADAPTOR FOR GEAR OR MOTOR OPERATOR
Filed June 28, 1965
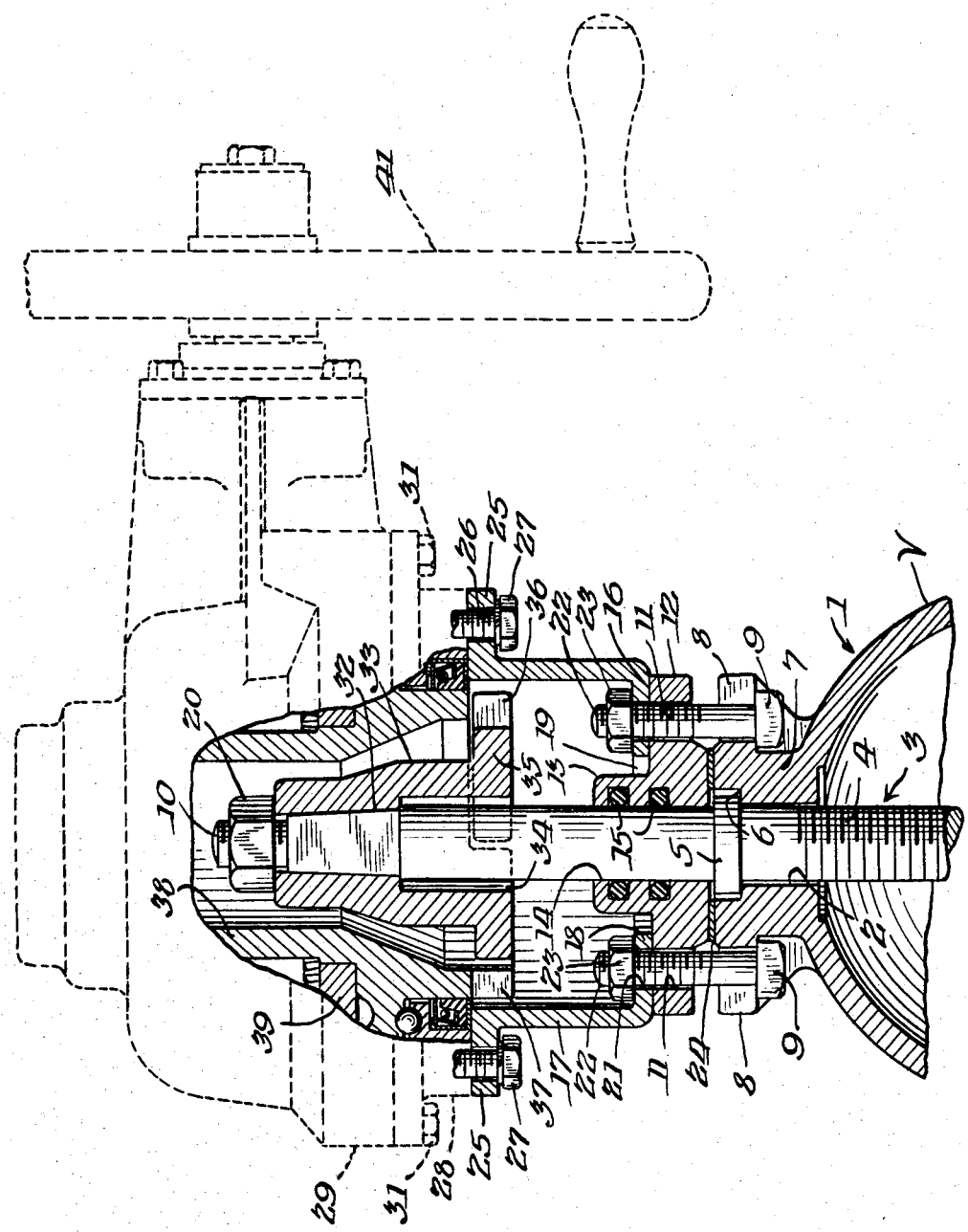
Inventor
Joseph A. Cerow

United States Patent Office 3,399,862
Patented Sept. 3, 1968

3,399,862
YOKE ADAPTOR FOR GEAR OR MOTOR OPERATOR
Joseph A. Cerow, Chicago, Ill., assignor to Crane Co., Chicago, Ill., a corporation of Illinois
Filed June 28, 1965, Ser. No. 469,057
5 Claims. (Cl. 251—214)

ABSTRACT OF THE DISCLOSURE

A detachable valve actuator for a turning, nonrising stem valve having O-ring stuffing box seals. The construction permits simple and convenient attachment of the actuator unit without disassembly of the valve, or disturbing the fluid seal and without alignment problems, by means of a stuffing box adaptor supported and bolted at the top of the stuffing box member of the valve to the usual slotted ears on opposite sides of the upper bonnet hub. Bolts of extended length to accommodate the added thickness of the flange portion of the adaptor are used in place of the usual ones supplied with the valve.

---

At the outset, in order to have a greater appreciation of the benefits arising from this invention, it should be realized that on valves having O-ring seals as a stuffing box for the valve stem, it has been extremely difficult to proivde a properly operating adaptor without the need for having special stuffing box adaptors to cooperate therewith.

Therefore, it is one of the more important objects of this invention to provide a construction for attaching the gear actuating mechanisms without interference with the stem sealant employed.

Another object is to provide for an adaptor mechanism for valve actuating means in which the said adaptors could be made easily and relatively inexpensively with or without a lost motion device by means of a lug drive in combination therewith.

Another object is to provide for an adaptor for use with a valve actuating means in which the alignment thereof is not critical and therefore the O-ring retainer employed in the invention does not require accurate machining and yet will easily permit the use of valve actuating means whether gear operated or motor driven in a wide variety of types.

Another important object is to provide for an adaptor mechanism in which the assembly can be made relatively easily in the field without the requirement for special tools or machining to effect the desired attachment of the valve actuating means.

Another important object is to provide for an adaptor mechanism in which the assembly can be made relatively easily in the field without the requirement for special tools or machining to effect the desired attachment of the valve actuating means.

A further object is to provide for an adaptor having a simple but effective sealing means requiring no skilled operator or installer and further avoiding the need for extreme skill in effecting the assembly.

Another important object is to provide for a valve actuator mechanism particularly adaptable to a rotating non-rising stem valve in which the assembly thereof can be easily made without disturbing the stem sealing means therefor.

Valves employing this type of mechanism as hereinafter referred to are frequently installed on a variety of manufacturers' valves without regard for any specific make, and, therefore, require a flexibility which is far above the average.

This invention constitutes an improvement over the construction shown in U.S. Patent No. 3,034,371, issued May 15, 1962, relating to detachable valve actuating means.

Other objects and advantages will become more readily apparent upon proceeding with the following description read in light of the accompanying single drawing showing a figure for a preferred adaptation of the mechanism constituting this invention.

Referring now to the single figure, a conventional valve incompletely shown is designated V and is provided with the valve bonnet generally designated 1, the valve being of the type known as a non-rising stem valve similar to that shown on page 90 of the Crane Co. No. 60 Catalog. The said valve bonnet at an upper portion thereof is provided with a bearing aperture 2 receiving the threaded valve stem 3 having the threaded portion 4. At a lower portion thereof (and not shown) a conventional valve gate is attached, the latter member being reciprocally movable depending upon the rotation of the stem 3 to provide for the opening and closing movements of the valve.

In this application of the adaptor, the valve stem being of a non-rising stem type is provided with a collar 5 received within and supported upon the shoulder or relieved portion 6 at the upper limit of the bonnet 1 as shown. At opposite sides of the bonnet hub 7, the slotted ears 8 are provided to receive the bolts 9, the latter being received so as to project through the apertures 11 of the O-ring stuffing box 12, the latter member having the upwardly extending hub or inner projection 13 bored as at 14 to receive said stem 3 and having preferably as sealants for said stem a pair of superposed spaced-apart O-rings 15, the upper one of which preferably serves as a dust seal and the lower one of which functions as a fluid seal. Obviously, the number, type and the shape of these rings may vary depending upon the size of the valve stem with which they are employed or the service encountered in the field.

As previously stated, the bolts 9 project through the apertures 11, the upper portion of the flange as at 16 serving as a supporting surface for the stuffing box adaptor 17 as indicated. The latter member is provided with the inwardly extending annular flange portion 18, thereby forming aperture 19 through which the hub 13 projects. The flange 18 is drilled with a plurality of annularly spaced apart holes 21 to receive the extending threaded portion 22 of the bolts 9 and upon which threaded portion the attaching nuts 23 are mounted for effecting the attachment of the adaptor 17 to the bonnet 1 as shown.

Preferably in order to provide for a fluid tight seal between the member 12 and the upper portion of the bonnet hub 7 a superposed gasket 24 or other fluid sealing means is positioned preferably having an inside diameter coinciding with the diameter of the recess or shoulder portion 6 of the valve bonnet.

At its upper portion, the stuffing box adaptor 17 is flanged as at 25 and drilled as at 26 to receive the capscrews 27, the latter being threadedly received within the depending portion or mounting flange 28, the latter flange serving as the means for attachment to the driver housing 29 by means of the cap screws 31.

At the upper end limit of the valve stem 3, a polygonal or preferably square portion 32 is provided which normally receives a valve handwheel (not shown). However, in order to accommodate the construction of the instant invention, the square portion 32 is provided with the stem adaptor 33, the latter member being preferably hollow as at 34 to extend downwardly over the stem and projecting within the stuffing box adaptor 17 as illustrated. It is retained to the stem by means of the nut 20.

At its lowermost portion, the stem adaptor 33 is enlarged as at 35 and is provided with the clutch lugs 36 for engagement with similar portions 37 on the drive sleeve 38. In all other respects, the relationship of the drive sleeve 38 to the driven gear 39 and the driving mechanism embodied within the housing 29 together with a drive gear (not shown) and the operator handwheel 41 is in accordance with the construction of said Patent No. 3,034,371. Under these circumstances, it is deemed unnecessary to describe in any greater detail the manner in which this assembly is completed to effect the rotation of the stem 3. Suffice to say, upon rotation of the handwheel 41, the drive sleeve 38 is rotated by means of the gearing 39 nonrotatably mounted on the drive sleeve 38 and the clutch lug member 37 which engages the transverse surface 36 of said lug portion on the stem adaptor 33 whereby to cause rotation of the said stem adaptor. Since the stem adaptor member is non-rotatably attached to the stem 3, it will, of course, be appreciated that the valve stem is correspondingly rotated, depending upon the direction of rotation of the handwheel 41 to open or close the valve as desired.

In effecting the assembly of the driver housing, the unit 29 in its positioning upon a valve in the field, it will be appreciated that from the polygonal portion 32 of the valve stem 3 a valve handwheel is removed as a first step, and in place of the handwheel the stem adaptor 33 is substituted. In this assembly, the usual stuffing box bolts, shown more clearly in the Crane illustration, are removed and substituted therefor are the bolts 9 having a special and sufficiently extended length to permit the assembly of the O-ring stuffing box member 12, and inwardly extending annular flange portion 18 to permit attachment by the nuts 23 to the bolts 9 as at threaded portion 22. Thus, the stuffing box 12 does not have to be disassembled in effecting this installation, but need only be moved upwardly a sufficient amount to permit the bolts 9 to engage the stuffing box adaptor 17 as shown. Accordingly, it will be apparent that the construction permits of a ready disassembly of the usual manually operated valve without special tools in the field and positioning thereover the valve actuating mechanism of the type shown in said patent or employing a motor driven unit of the type as, for example, shown in U.S. Patent 3,234,818, issued Feb. 15, 1966, entitled Valve Operating Mechanism, assigned to Crane Co., and commercially known by its registered trademark No. 724,173, "Crane Teledyne."

It will thus be apparent that the adaptor of this invention possesses considerable versatility in permitting a ready option by the customer in the field in employing either a reducing gear operating unit, such as that mentioned in the patent and known as the Crane "Converto-Gear" (Reg. No. 715,415) or the "Teledyne" not above referred to.

While only a single embodiment has been shown and described, this is done solely for purposes of illustration, since the adaptor of this invention has a wide variety of uses and applications, and therefore, the scope of the invention should be measured by the appended claims read in light of the art of record.

I claim:
1. In a valve actuating means having a rotatable nonrising stem and a closure member actuated by rotation of the stem, the said stem having an enlarged collar for inhibiting substantial axial movement of the said stem, the combination including a stuffing box cooperating with said stem enlarged collar to provide said inhibition of the stem axial movement and having O-ring sealing means above the said stem collar around said stem, a valve bonnet member supporting said stuffing box, a stuffing box adaptor supported on said stuffing box having an inturned apertured flange portion, bolt means for retaining said stuffing box and said stuffing box adaptor to said bonnet member, the said bolt means engaging said inturned flange portion to clamp said stuffing box between said inturned flange portion and an upper surface of said bonnet adjacent said stem enlarged collar, a hollow stem adaptor mounted nonrotatably on said stem projecting within said stuffing box adaptor, said valve actuating means having a drive sleeve supported on said stuffing box adaptor and having a lower portion engageable by the said hollow stem adaptor member, a driven gear nonrotatably mounted on the drive sleeve, a housing for the said drive sleeve and drive gear, the said stuffing box adaptor being axially aligned above the stem adaptor supporting the said housing, a mounting flange between the said housing and said stuffing box adaptor for effecting attachment of the said housing to the stuffing box adaptor, said valve actuating means having a drive gear meshing with the said driven gear and including a shaft for the said drive gear in the housing above the said stuffing box adaptor, the shaft having a portion forming an end limit of the said housing, the latter limits of the shaft having end connecting means providing for operation whereby to rotate said shaft and drive gear to thereby rotate said stem.

2. The subject matter of claim 1, fluid sealing means interposed between said stuffing box and valve.

3. The subject matter of claim 1, the said stuffing box having a hub portion within the said stuffing box adaptor.

4. The subject matter of claim 3, the said stuffing box adaptor having a centrally apertured portion forming said inturned flange to receive said stuffing box hub portion.

5. The subject matter of claim 3, the said bolt means for retaining said stuffing box to said bonnet member being mounted in spaced apart annular relation around said box hub portion.

References Cited
UNITED STATES PATENTS

| | | | |
|---|---|---|---|
| 2,352,140 | 6/1944 | Trott | 74—625 |
| 2,452,428 | 10/1948 | Bryant | 74—504 |
| 2,709,062 | 5/1955 | Lamb | 74—625 X |
| 3,034,371 | 5/1962 | Cantalupo et al. | 74—423 |

WILLIAM F. O'DEA, *Primary Examiner.*

DAVID R. MATTHEWS, *Assistant Examiner.*